(12) United States Patent
Trimble (10) Patent No.: US 8,573,387 B2
(45) Date of Patent: Nov. 5, 2013

(54) FOLDABLE FRAMEWORK FOR AUXILIARY CONVEYOR

(76) Inventor: David Trimble, Dromore (GB)

( * ) Notice: Subject to any disclaimer, the term of this patent is extended or adjusted under 35 U.S.C. 154(b) by 397 days.

(21) Appl. No.: 12/529,738

(22) PCT Filed: Mar. 7, 2008

(86) PCT No.: PCT/EP2008/001833
§ 371 (c)(1),
(2), (4) Date: Mar. 3, 2010

(87) PCT Pub. No.: WO2008/107200
PCT Pub. Date: Sep. 12, 2008

(65) Prior Publication Data
US 2010/0213033 A1    Aug. 26, 2010

(30) Foreign Application Priority Data

Mar. 7, 2007  (GB) .................................. 0704337.5
Apr. 23, 2007  (GB) .................................. 0707792.8

(51) Int. Cl.
*B65G 21/10*  (2006.01)

(52) U.S. Cl.
USPC .................... 198/632; 198/313; 198/316.1

(58) Field of Classification Search
USPC ........... 198/313, 315, 316.1, 632, 538, 861.2, 198/861.3
See application file for complete search history.

(56) References Cited

U.S. PATENT DOCUMENTS

| | | | |
|---|---|---|---|
| 2,834,487 A * | 5/1958 | Gaddis | 414/523 |
| 3,337,068 A * | 8/1967 | Meharry | 414/523 |
| 3,717,272 A * | 2/1973 | Chartier et al. | 414/472 |
| 3,719,268 A * | 3/1973 | Koehnen | 98/632 |
| 3,802,022 A * | 4/1974 | Fleming | 15/84 |
| 4,591,432 A * | 5/1986 | Hartl | 209/247 |
| 4,669,945 A * | 6/1987 | Pollard et al. | 414/505 |
| 4,714,398 A * | 12/1987 | Rohwedder | 414/503 |
| 5,013,208 A * | 5/1991 | Grieshop | 414/526 |
| 5,044,867 A * | 9/1991 | Pettijohn | 414/523 |
| 5,316,431 A * | 5/1994 | Barber | 414/523 |
| 5,333,725 A * | 8/1994 | Douglas | 198/632 |
| 5,538,388 A * | 7/1996 | Bergkamp et al. | 414/523 |
| 6,119,847 A * | 9/2000 | Mooney et al. | 198/632 |
| 6,360,876 B1 * | 3/2002 | Nohl et al. | 198/588 |
| 6,543,622 B1 * | 4/2003 | Fridman | 209/421 |
| 6,662,939 B1 | 12/2003 | McCusker et al. | |
| 6,910,586 B2 * | 6/2005 | McCloskey | 209/241 |
| 6,935,587 B2 | 8/2005 | Brock et al. | |
| 7,143,968 B2 | 12/2006 | Brock et al. | |
| 7,223,059 B2 | 5/2007 | Smith et al. | |
| 7,264,104 B2 * | 9/2007 | Heeszel et al. | 198/317 |
| 7,267,519 B2 * | 9/2007 | Cresswell et al. | 414/526 |
| 7,296,676 B2 | 11/2007 | Smith et al. | |
| 7,552,818 B2 * | 6/2009 | Makinen et al. | 198/861.2 |
| 8,025,140 B2 * | 9/2011 | Whyte et al. | 198/317 |
| 8,113,332 B2 * | 2/2012 | Devlin et al. | 198/313 |
| 2009/0308718 A1 * | 12/2009 | Devlin et al. | 198/861.2 |

* cited by examiner

FOREIGN PATENT DOCUMENTS

EP    0 506 812 B1    10/1997

*Primary Examiner* — Joseph Dillon, Jr.
(74) *Attorney, Agent, or Firm* — Smith Moore Leatherwood LLP (57) ABSTRACT

An aggregate processing apparatus comprising a conveyor having its base coupled to the apparatus, the coupling allowing the conveyor to pivot about a first axis that is substantially parallel with the longitudinal axis of the conveyor, and to pivot substantially at the base towards and away from said apparatus. The conveyor is actuatable between a deployed state in which it projects from said apparatus, and a folded state in which it is disposed substantially against said apparatus.

21 Claims, 9 Drawing Sheets

FOLDABLE FRAMEWORK FOR AUXILIARY CONVEYOR

CROSS REFERENCE TO RELATED APPLICATIONS

This application is a 35 U.S.C. 371 National Phase application of International Application No. PCT/EP2008/001833, filed Mar. 7, 2008, which claims priority to Great Britain Application No. GB 0704337.5, filed Mar. 7, 2007, and Great Britain Application No. GB 0707792.8, filed Apr. 23, 2007, all of which herein are incorporated in their entirety.

FIELD OF THE INVENTION

The present invention relates to conveyors, especially conveyors for use on mobile aggregate processing apparatus such as screening or crushing apparatus.

BACKGROUND TO THE INVENTION

Mobile aggregate processing apparatus commonly include a plurality of conveyors for transferring processed aggregate from the apparatus. It is known for such apparatus to include a respective side conveyor projecting perpendicularly from each side of the apparatus. When not in use, some side conveyors may be folded against the respective side of the apparatus in order to facilitate transporting the apparatus from site to site. Alternatively, the side conveyors may be removed. U.S. Pat. No. 6,662,939 (McCusker) shows an example of a foldable side conveyor.

When the level of complexity of the processing apparatus or its operation increases, there can be a need for one or more additional conveyors, sometimes referred to as auxiliary conveyors. This particularly the case for screening apparatus where the screen includes three or more screening decks. These conveyors are often located at a side of the apparatus and so present the same problem as other side mounted conveyors, namely that they add significantly to the width of the apparatus and so must be folded or removed during transport. In addition, they compete for space with existing side conveyors and this can be problematic, especially if it is desired to fold all conveyors when not in use. Accordingly, auxiliary side conveyors are conventionally removable from the apparatus when not in use. This is undesirable since it requires additional machinery, e.g. a crane, to install and remove the conveyor, as well as requiring additional vehicles to transport the conveyor.

It would be desirable to mitigate the problems outlined above.

SUMMARY OF THE INVENTION

Accordingly, from a first aspect, the invention provides a material processing apparatus comprising: a conveyor having an elongate frame with a base, a free end distal the base, and means for conveying material from said base to said free end; means for coupling said frame to said apparatus such that said base is located adjacent said apparatus; and means for actuating said conveyor between a deployed state in which it projects from said apparatus, and a folded state in which it is disposed substantially against said apparatus, wherein said coupling means and said actuating means are arranged to cause said frame to pivot about said base when moving between said deployed and folded states, and to rotate such that the obverse face, or the reverse face, of the conveyor substantially faces said apparatus in the folded state.

In typical embodiments, the conveyor is a belt-type conveyor, the arrangement being such that the loading end of the conveyor, or belt, is located substantially at the base of the frame.

When moving between the deployed and storage states, the conveyor is pivoted substantially about its base. This allows the conveyor to be compact in its folded state. It is further preferred that the main frame is obliquely disposed with respect to the longitudinal axis of the apparatus when in the deployed state.

In some embodiments, said conveyor is rotatable about a first axis that is substantially coplanar with the conveyor, and preferably substantially coincident with, or substantially parallel with, the longitudinal axis of the frame.

In preferred embodiments, the conveyor includes means for pivotably coupling the base of the main frame to the apparatus. The coupling means may take any convenient form, e.g. a pivot joint allowing pivotal movement about at least one axis, or a universal joint. The coupling means is advantageously provided at a side of the main frame nearest the apparatus (hereinafter the near side), adjacent said base.

The conveyor preferably also includes a link member having a first end pivotably coupled to the other side (hereinafter the far side) of the main frame, and a second end pivotably coupled in use to the apparatus. In the preferred embodiment, said second end is pivotably coupled to a gantry which is mounted on the apparatus. The link member preferably extends obliquely across the main frame, said second end preferably being located substantially at or in line with, but preferably above, the base of the main frame.

The conveyor preferably also includes first actuating means, comprising for example a ram, provided between the far side of the main frame and the link member or between the near side of the main frame and the link member.

Advantageously, second actuating means, comprising for example a ram, is provided between the main frame, conveniently the near side of the main frame, and the apparatus.

From a second aspect, the invention provides a conveyor, especially a belt-type conveyor, having an elongate frame with a base, a free end distal the base, and means for conveying material from said base to said free end; means for coupling said frame to an apparatus such that said base is located adjacent said apparatus; and means for actuating said conveyor between a deployed state in which it projects from said apparatus, and a folded state in which it is disposed substantially against said apparatus, wherein said coupling means is arranged to cause said frame to pivot about said base when moving between said deployed and folded states, and to rotate such that the obverse face, or the reverse face, of the conveyor substantially faces said apparatus in the folded state.

From a third aspect, the invention provides a framework for a conveyor, the framework comprising an elongate frame with a base, a free end distal the base; means for coupling said frame to a material processing apparatus such that said base is located adjacent said apparatus; and means for actuating said conveyor between a deployed state in which it projects from said apparatus, and a folded state in which it is disposed substantially against said apparatus, wherein said coupling means is arranged to cause said frame to pivot about said base when moving between said deployed and folded states, and to and to rotate such that the obverse face, or the reverse face, of the conveyor substantially faces said apparatus in the folded state.

Preferred features are recited in the dependent claims.

In preferred embodiments, the processing apparatus includes a second conveyor mounted on the apparatus adjacent said first conveyor, the second conveyor being operable between a deployed state and a folded state, wherein, when each conveyor is in its respective folded state, the first conveyor is located substantially beneath the second conveyor, each conveyor preferably being located substantially against a common side of the apparatus.

Further advantageous aspects of the invention will be apparent to those ordinarily skilled in the art upon review of the folding description of a specific embodiment and with reference to the accompanying drawings.

BRIEF DESCRIPTION OF THE DRAWINGS

Embodiments of the invention is now described by way of example and with reference to the accompanying drawings in which like numerals are used to denote like parts and in which.

DETAILED DESCRIPTION OF THE DRAWINGS

Referring now to the drawings, there is shown, generally indicated as 10, a conveyor including a framework 12 embodying one aspect of the invention. In the illustrated example, the conveyor 10 is a belt-type conveyor and so includes a belt 14, conveyor rollers 16, 17 around which the belt 14 is mounted and drive means, typically a motor 19, e.g. a hydraulic motor, for driving at least one of the rollers 16, 17. The conveyor 10 also includes a plurality of sets of troughing rollers 18 for supporting and shaping the belt 14 during use. One or more idling rollers 20 may also be provided to help keep the belt 14 in place during use. It will be understood that the invention is not limited by the specific configuration of conveyor illustrated in the drawings and may be used with conveyors, or other equipment, having a variety of different configurations. In alternative embodiments, the conveyor need not necessarily be a belt-type conveyor, e.g. it may be a roller-type conveyor in which the conveying means comprises a plurality of substantially parallel rollers.

Figure 4:
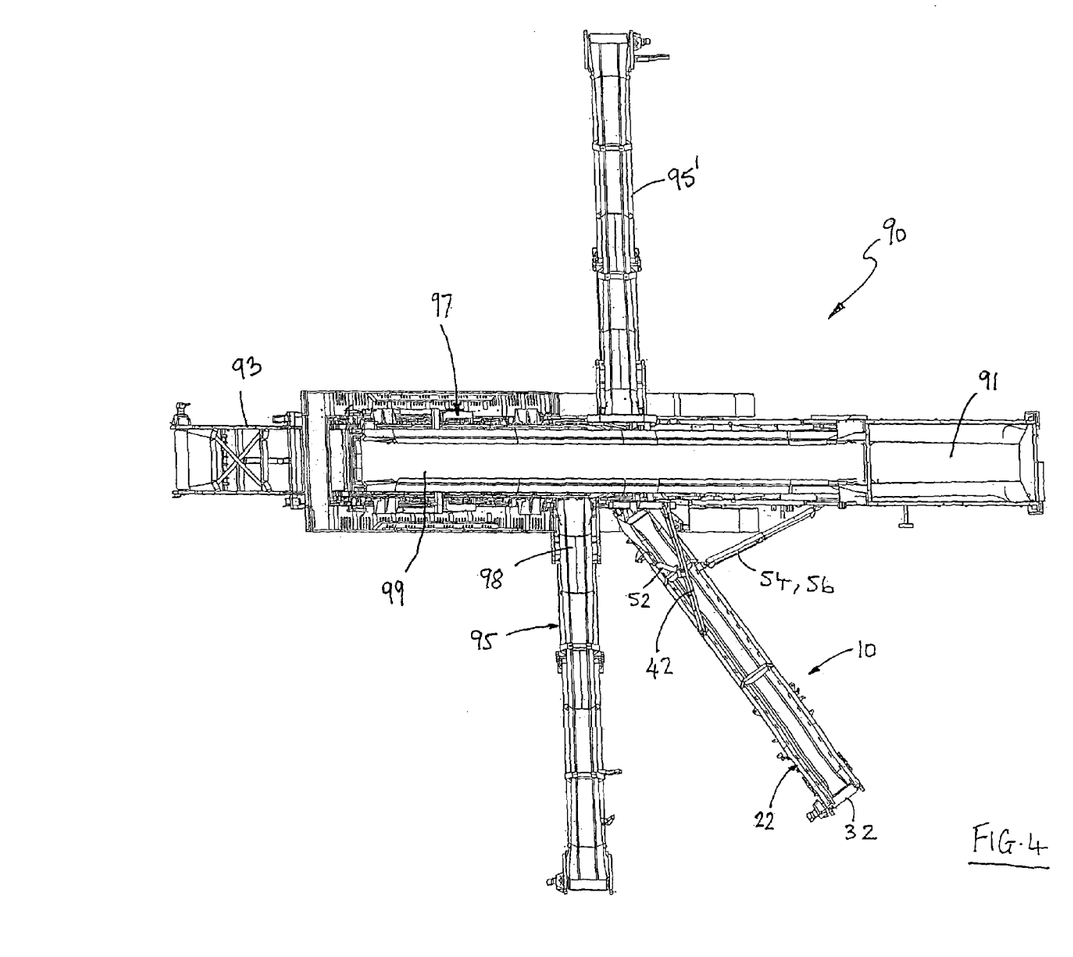
FIG. 4 is a plan view of the framework of FIG. 1 mounted on a mobile screening apparatus, the framework being shown in the deployed state.
Figure 5:
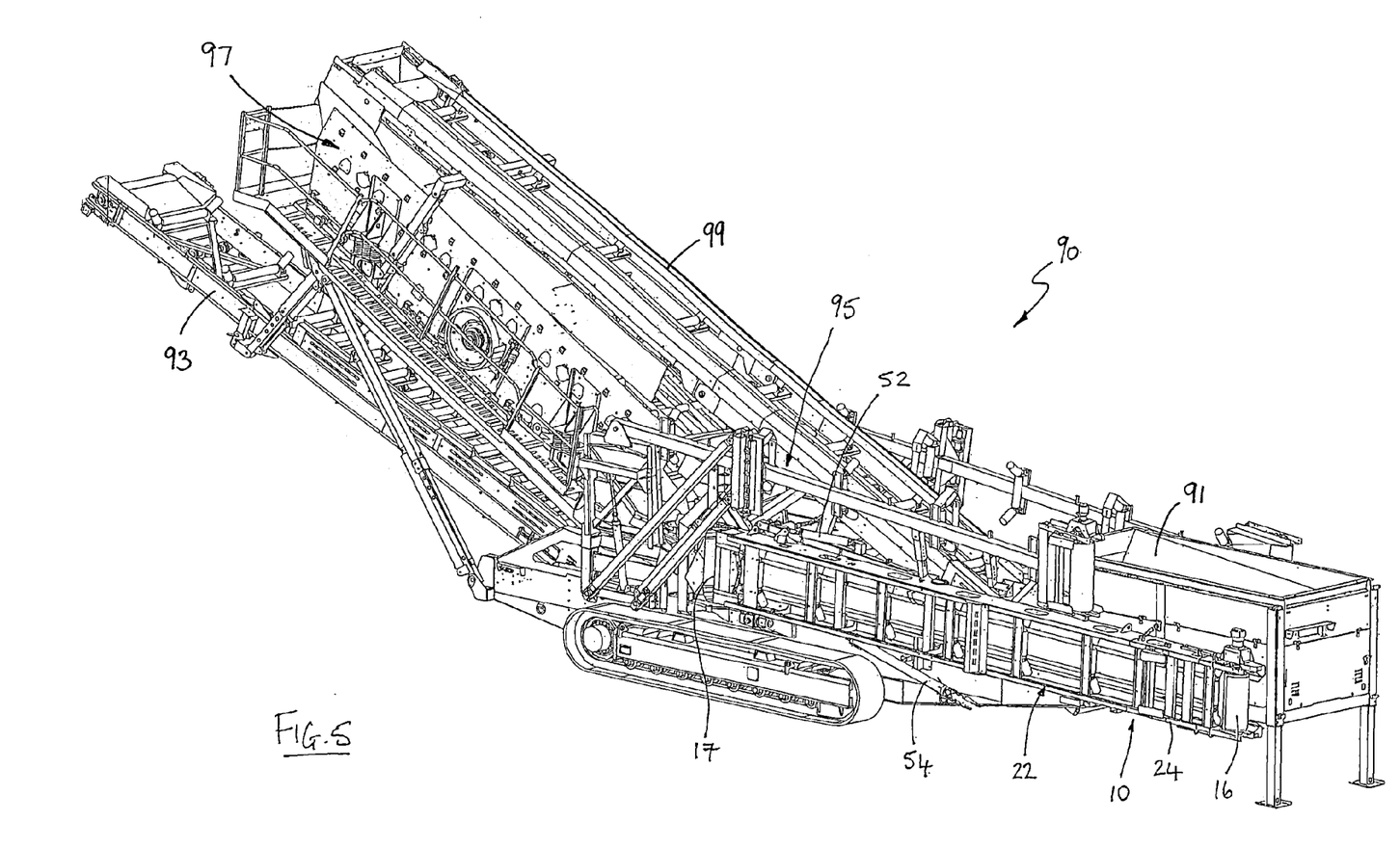
FIG. 5 is a perspective view of the screening apparatus showing framework in the folded state.

The conveyor 10 is particularly, but not exclusively, intended for use on an aggregate processing plant or apparatus 90 which, in FIGS. 4 and 5, takes the preferred form of a mobile screening apparatus. The apparatus 90 typically includes an aggregate screening device 97 arranged to deliver screened material (not shown) onto one or more conveyors which, in the illustrated example include the conveyor 10, two side conveyors 95, 95' and a rear conveyor 93. Usually, the apparatus 90 also includes a hopper 91 for receiving the material to be screened, and a main conveyor 99 for carrying the material from the hopper 91 to the screening device 97. In preferred embodiments, the conveyor 10 is located at a side of the apparatus 90, typically adjacent one or more other side-mounted conveyors 95.

The conveyor 10 has a loading end 11 and a discharging end 13, the loading end 11 being coupled to the apparatus 90 and arranged to receive, in use, aggregate or other material from the apparatus 90, whereupon the received material is conveyed along the conveyor 10 and discharged via the discharging end 13. The conveyor 10 may include a guard 15 at its loading end 11 to help guide material onto the belt 14. The conveyor 10 has an obverse face 21 facing generally upwards when the conveyor 10 is deployed and a reverse face, or underside, that faces generally downwards. During use, said material is carried along the obverse face.

The framework 12 includes a main frame 22, on which, in the illustrated example the rollers 16, 17, 18, 20, and motor 19 are mounted. The conveyor rollers 16, 17 are provided at respective ends of the main frame 22 and the motor 19 is conveniently located adjacent roller 16 and is coupled thereto. The belt 14 is fitted around the rollers 16, 17 in an endless loop. The troughing rollers 18 are spaced apart along the length of the frame 22 between the conveyor rollers 16, 17. The main frame 22 typically comprises two spaced-apart elongate side supports 24, 25 joined together by a plurality of cross-pieces 26. The framework 12 and its component parts may be made from any suitable material, typically metal.

The main frame 22 has a base, or proximal, end 30 and a distal end 32, corresponding respectively to the loading and discharging ends 11, 13 of the conveyor 10. In use, the main frame 22 is pivotably coupled to the screening apparatus 90 at or adjacent its proximal end 30. When mounted on the apparatus 90, the main frame 22 may be said to have a near side 36 and a far side 38 which, in the illustrated embodiment, are provided respectively by the side supports 24, 25.

Figure 1:
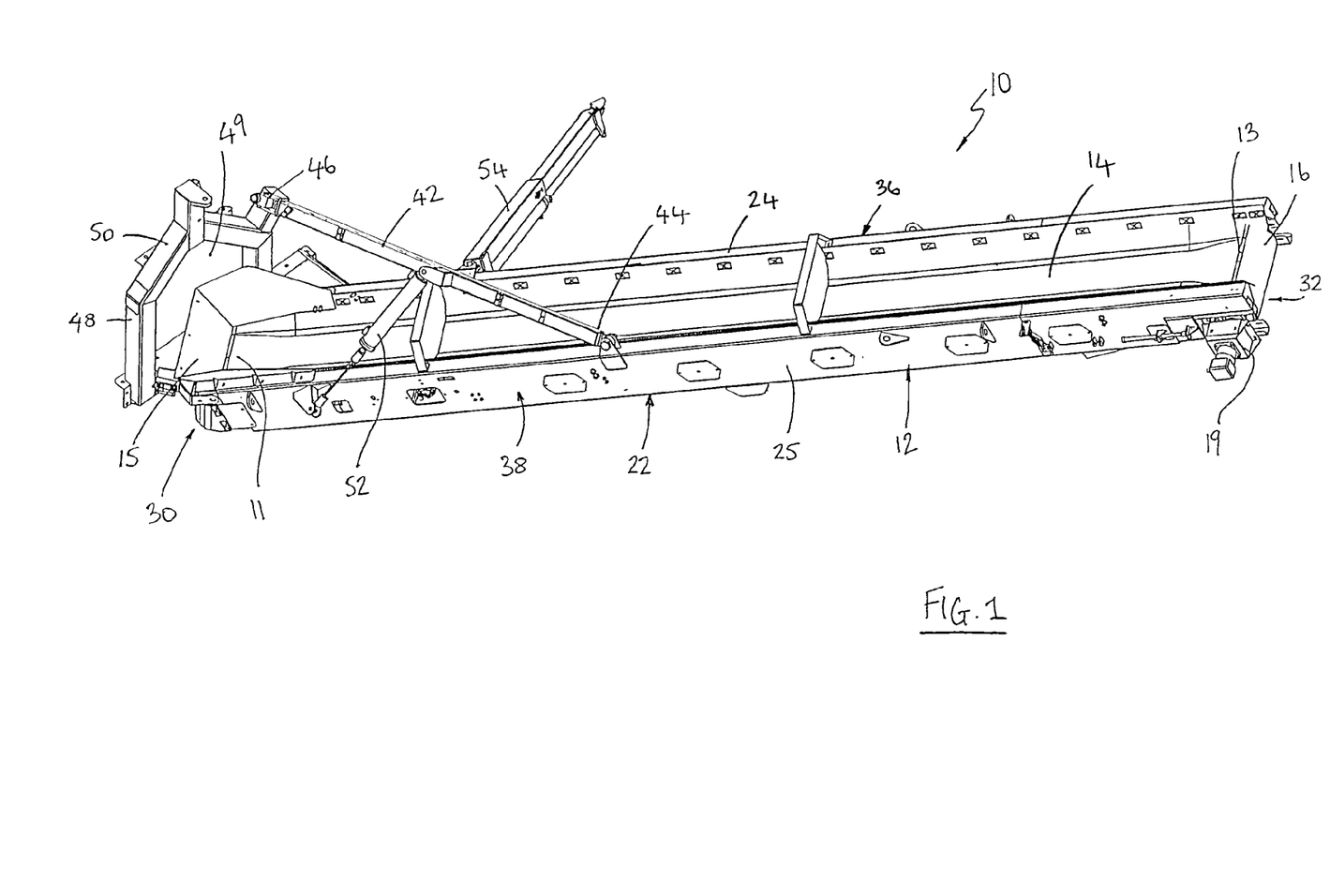
FIG. 1 is a perspective view of a framework embodying the invention, the framework being shown as part of a belt conveyor, the framework and conveyor being shown in a deployed state.
Figure 2:
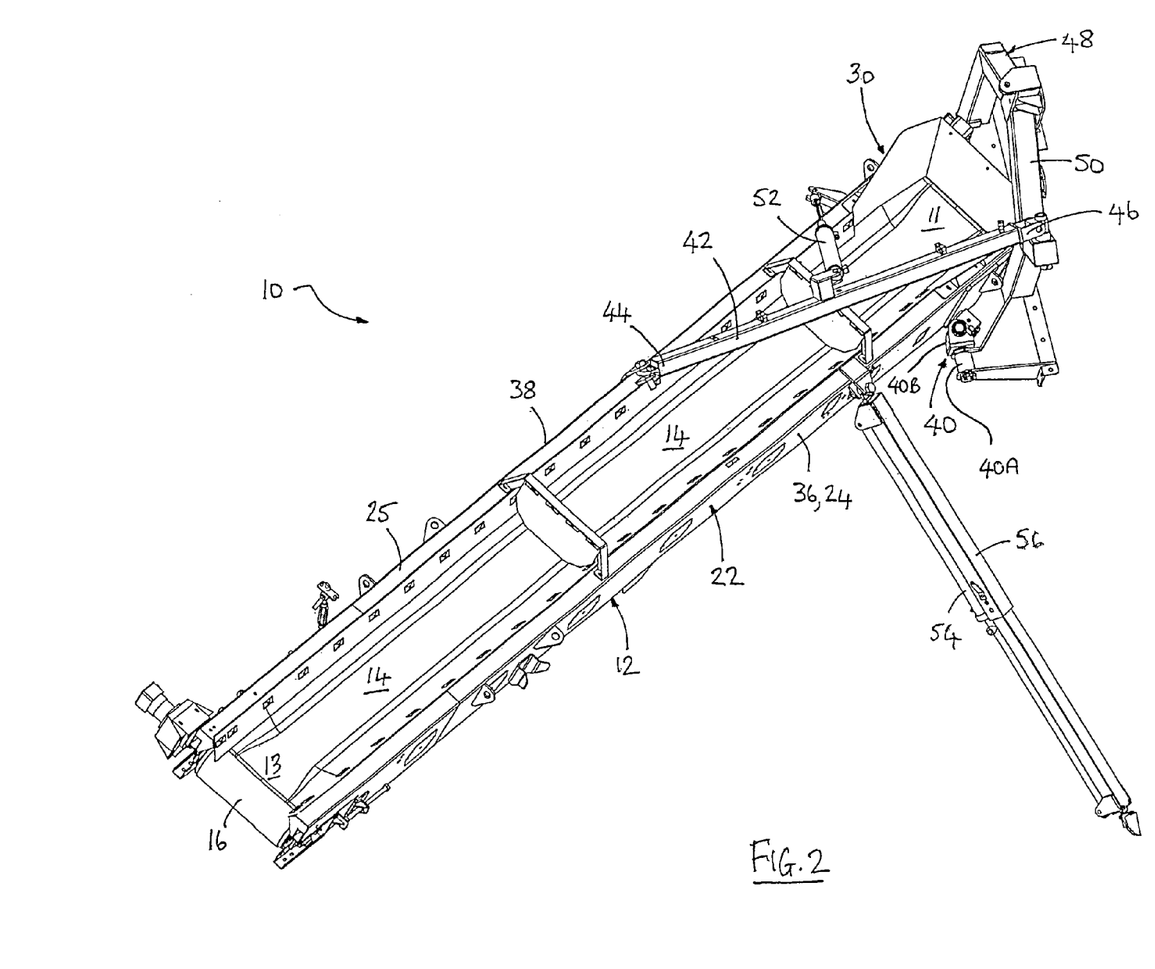
FIG. 2 is an alternative perspective view of the framework of FIG. 1.
Figure 3:
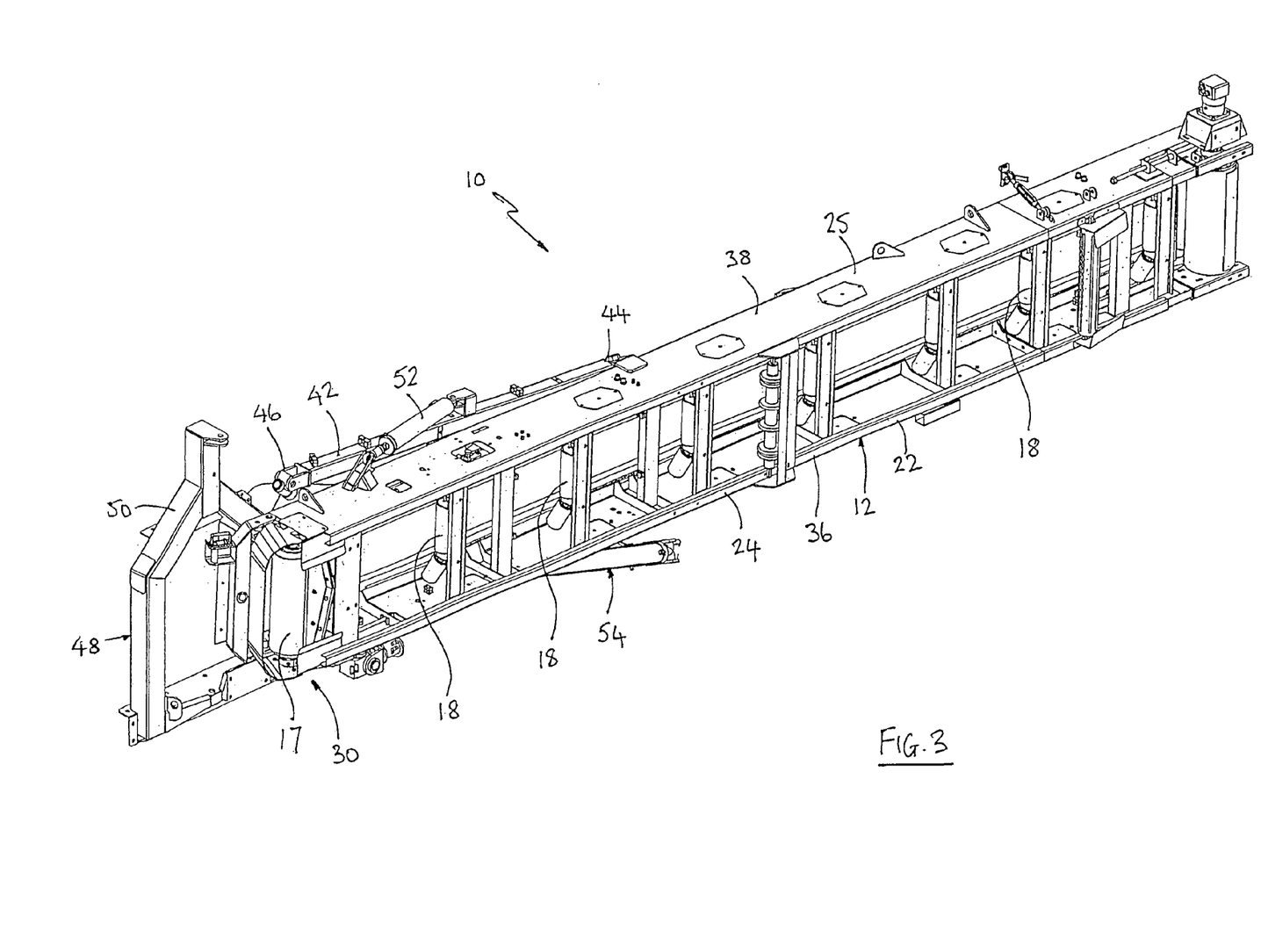
FIG. 3 is an alternative perspective view of the framework of FIG. 1, the framework being shown in a folded state.
Figure 8:
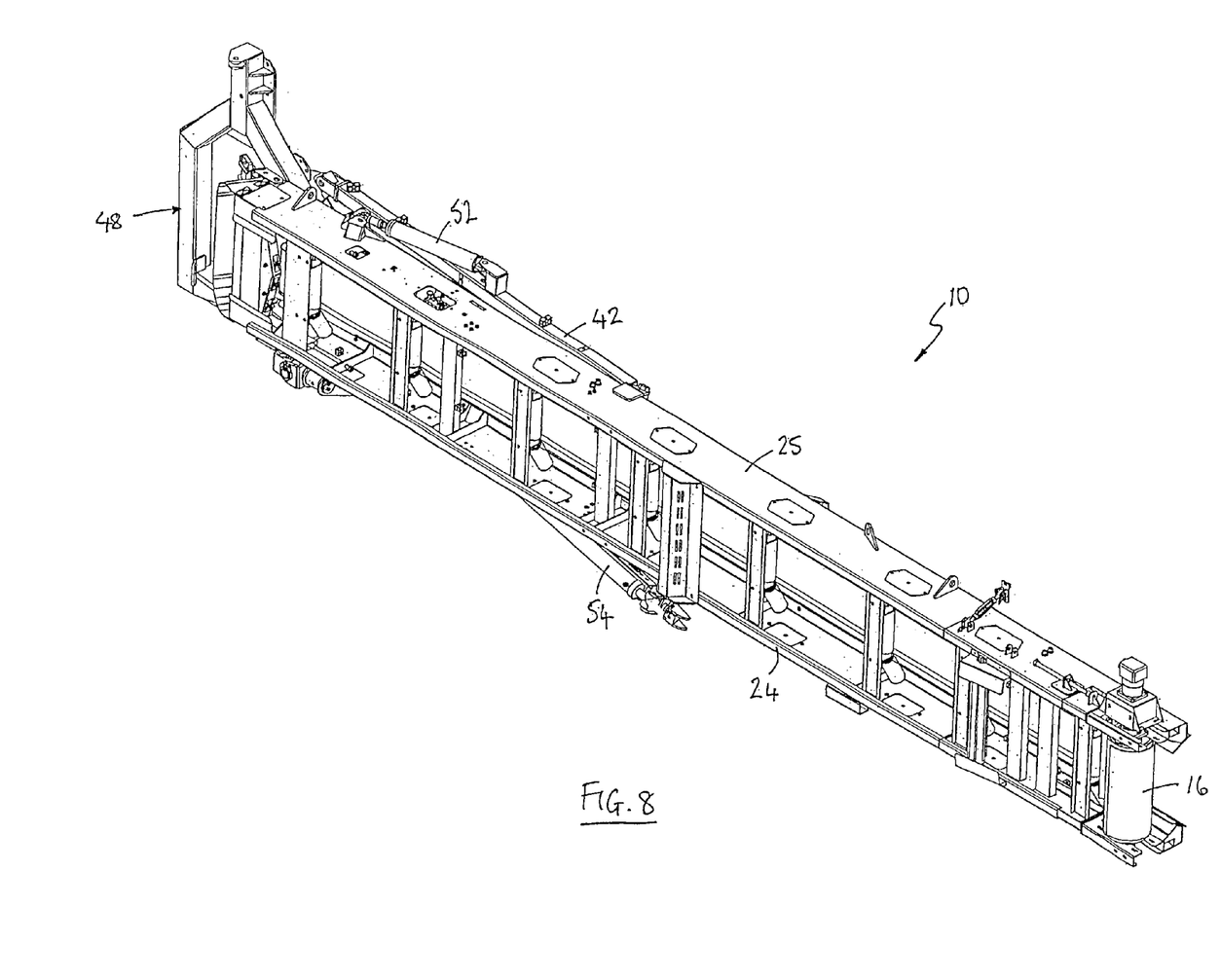

The conveyor 10 is operable between a deployed state (as shown for example in FIGS. 1, 4 and 6) and a stored, or folded, state (as shown for example in FIGS. 3, 5 and 8). Preferably, the conveyor 10 extends obliquely (when viewed in plan) from the longitudinal axis of the apparatus 90 when in the deployed state. In the folded state, the conveyor 10 is located substantially against the apparatus 90 and, preferably, extends substantially parallel with the apparatus 90 (preferably, although not necessarily, substantially parallel with the longitudinal axis of the apparatus 90). In the preferred embodiment, the obverse face 21 of the conveyor 10 substantially faces, and is preferably located substantially against, the apparatus 90. In alternative embodiments (not illustrated), the conveyor 10 may be rotated in an opposite sense such that its reverse face, or underside, faces the apparatus 90. Preferably, the conveyor 10 pivots between the deployed and folded states as a unit from its base and without any folding of the conveyor itself about a location between its proximal and distal ends.

In order that the conveyor 10 may move between the deployed and folded states, coupling means are provided to pivotably couple the conveyor 10 to the apparatus 90 at, or substantially at, its loading end 11, 30. The coupling means between the conveyor 10 and the apparatus 90 allows not only pivoting movement of the conveyor towards and away from the apparatus 90, but also a pivoting, or rotational, movement of the conveyor 10 such that the plane in which it is disposed (which may be said to be substantially coincident with, or substantially parallel with, the obverse face 21) is rotated or pivoted. Both of these pivoting movements may be achieved by causing the conveyor to be pivotable about an axis that runs substantially parallel with the longitudinal axis of the apparatus 90 and which passes through a pivot point substantially at the base 11, 30 of the conveyor 10. Alternatively, the coupling means may be such that it allows the conveyor 10 to pivot about two or more non-parallel, or substantially perpendicular, axes. In preferred embodiments, the coupling is arranged to allow the conveyor 10 to be rotated about a first axis that runs substantially longitudinally of the conveyor 10. Advantageously, the or each axis about which the conveyor 10 is pivotable passes through a common, or a respective, pivot point located substantially at the base 11, 30 of the conveyor 10, and preferably at a side of the base 11, 30. For example, the coupling may be configured to allow pivoting of the conveyor 10 about a first axis that lies substantially in the same plane as the conveyor, e.g. substantially coincident, or parallel, with the longitudinal axis of the conveyor 10, and a second axis that is substantially vertical in use (or at least substantially normal to the ground on which the apparatus 90 is located during use). In cases where the conveyor 10 is substantially horizontally disposed when deployed, the first and second axes are conveniently mutually perpendicular. In other cases, the conveyor 10 may slope upwardly in a direction away from the apparatus 90 when deployed, in which case the first and second axes are not necessarily mutually perpendicular. In preferred embodiments, said first axis runs substantially along a side of the conveyor 10. Optionally, the coupling means may be arranged to allow pivoting movement of the conveyor 10 about a third axis that projects laterally from the apparatus 10, substantially perpendicular with the longitudinal axis of the apparatus 90.

The coupling means may take any suitable form but, in the illustrated example, takes the form of a pivot device 40 which allows pivoting movement about two mutually perpendicular axes, e.g. a double pivot joint. The pivot device 40 has a first pivot joint 40A that allows pivoting movement about a first axis that is substantially parallel with the longitudinal axis of the apparatus 90, and a second pivot joint 40B connected between the first pivot joint 40A and the conveyor 10 and allowing pivoting movement about an axis that is substantially perpendicular to the first axis. Alternative pivot devices may be used, for example a universal joint, or an angled joint allowing pivoting movement about only one axis. For example, a pivot device allowing pivoting movement about an axis substantially parallel with the apparatus 90, the axis preferably being in substantially the same plane as the conveyor 10 would suffice. In the preferred embodiment, the pivot device 40, or other coupling means, is located at, or adjacent, the proximal end 30 of the frame 22, most preferably at the near side 36.

The framework 12 further includes a link, or support, member 42 having a first end 44 pivotably coupled to the main frame 22 and a second end 46 pivotably coupled in use to the apparatus 90, or in preferred embodiments, to a gantry 48 which is in use, mounted on the apparatus 90. More particularly, the end 44 is coupled to the far side 38 of the main frame 22 at a location between the proximal and distal ends 30, 32, for example from approximately one quarter of the way from the proximal end 30 to the distal end 32. The actual location of the end 44 may be determined by the length of the conveyor and is in this example approximately ⅜ of the way from the proximal end 30 to the distal end 32. The second end 46 of the link 42 is located substantially at, or in line with, the near side 36 of the main frame 22, the preferred arrangement being such that the link 42 extends obliquely across the main frame 22. In the preferred embodiment, the end 46 of the link 42 is located above the main frame 22 in use, and more particularly above, and substantially in register with, the proximal end 30. In the illustrated embodiment, this is achieved by providing the gantry 48 substantially at or adjacent the proximal end 30, the gantry 48 having an elevated cross piece 50 to which the end 46 of the link 42 is coupled. Preferably, the gantry 48 is shaped to define a mouth 49 through which material can be fed onto the conveyor 10 during use. In alternative embodiments, the gantry may be omitted and the conveyor 10 can be connected to its host apparatus directly or indirectly by any other suitable means. The preferred arrangement is such that the end 46 is located above the conveyor, when deployed, by a distance approximately equal to, or at least equal to, the width of the conveyor 10. This allows the link 42 to extend substantially along the side 38 of the frame 22 in the folded state.

The couplings provided at the ends 44, 46 of the link 42 may take any suitable form in order to provide appropriate freedom of movement between the link 42 and the frame 22 and gantry 48. For example a simple loop and pin coupling is shown at end 44, while a double pivot joint—allowing pivoting movement about two mutually perpendicular axes—is shown at end 46. The link member 42 is substantially rigid and preferably, but not necessarily, of fixed length. The length of the link member 42 determines the position of the conveyor 10 in the deployed state. In use, the link 42 holds the conveyor 10 at a desired working angle and guides the movement of the conveyor 10 as it pivots between its deployed and folded states.

First actuating means, in the preferred form of a linear actuator 52, e.g. comprising a hydraulic ram or other ram, is provided between the main frame 22 and the link 42. In the embodiment of FIGS. 1 to 8, one end of the ram 52 is coupled to the far side 38 of the main frame 22 between the end 44 of the link 42 and the proximal end 30 of the frame 22, the other end of the ram 52 being coupled to the link 42 between its ends 44, 46, e.g. substantially at its mid-point. The first actuating means is arranged to effect a rotational movement of the frame 22 about an axis that is substantially parallel with the longitudinal axis of the conveyor 10. In the illustrated embodiment, the axis runs substantially along the near side 36 of the frame 22. In an alternative embodiment (not illustrated) the actuator 52 and link 42 are provided beneath the conveyor when in the deployed state, e.g. a mirror image version of what is depicted in the drawings. In this case, the end 46 is coupled to the apparatus 90 at a point below the conveyor and the link traverses the underside of the conveyor. In such embodiments, the conveyor 10 may be pivoted so that in the folded state, its reverse face, i.e. its underside, faces and is located substantially against the apparatus 90. In the deployed state, the actuator 52 extends partly across the obverse (or reverse) face of the conveyor, while in the folded state, the actuator 52 extends substantially along a side of the conveyor. The respective coupling between the actuator 52 and the conveyor 10 and link 42 may take any suitable form, e.g. couplings allowing pivoting movement about one or more axis as required.

Second actuating means, which preferably comprises a linear actuator 54, e.g. comprising a hydraulic ram or other ram, is provided between the main frame 22 and the apparatus 90. In particular, one end of the ram 54 may be coupled to the near side 36 of the main frame 22 between the proximal and distal ends 30, 32, the other end of the ram 54 being coupled to any convenient point on the apparatus 90. To lend support, the actuator 54 is preferably connected to an extendable support member 56, e.g. a telescopic bar, whereby extension and retraction of the actuator 54 causes a corresponding extension or retraction of the support bar 56. Respective ends of the support bar 56, or the actuator 54 when the bar 56 is not present, are pivotably coupled to the frame 22 and apparatus 90 by means of any suitable pivoting joint. In use, the actuator 54 acts on the bar 56 which correspondingly acts on the main frame 22.

The first actuating means is arranged to effect primarily a rotational movement of the conveyor 10 about an axis that runs substantially longitudinal of the conveyor 10. The first actuating means also helps to hold the conveyor in its deployed state. The second actuating means is arranged to effect primarily a pivoting movement of the frame 22 towards or away from the apparatus 90, especially about an axis that is substantially vertical during use. The second actuating means may also serve to hold the conveyor in its deployed state. It will be appreciated that the rams 52, 54 shown in the drawings may be provided in alternative locations while still effecting the desired movement of the conveyor 10.

In the illustrated embodiment, the actuators 52, 54 could be operated in sequence whereby actuator 54 effects movement of the conveyor 10 about pivot joint 40B, and actuator 52 effects movement of the conveyor 10 about pivot joint 40A. In this case, it is preferred to operate actuator 52 first when deploying and last when folding. Alternatively, the actuators 52, 54 are operated simultaneously.

Figure 6:
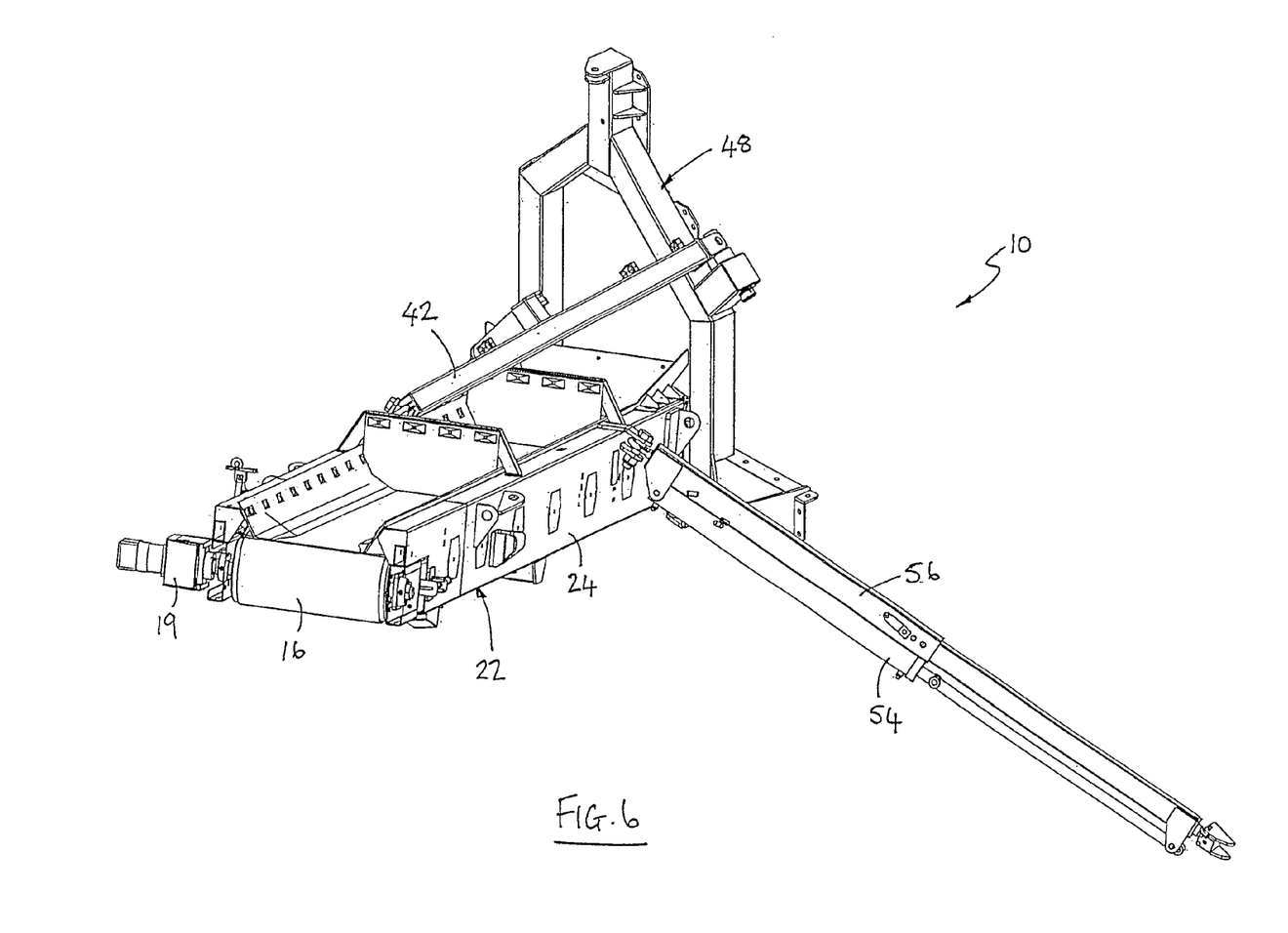
FIGS. 6 to 8 show respective perspective views of the framework as it folds from the deployed state to the folded state.
Figure 7:
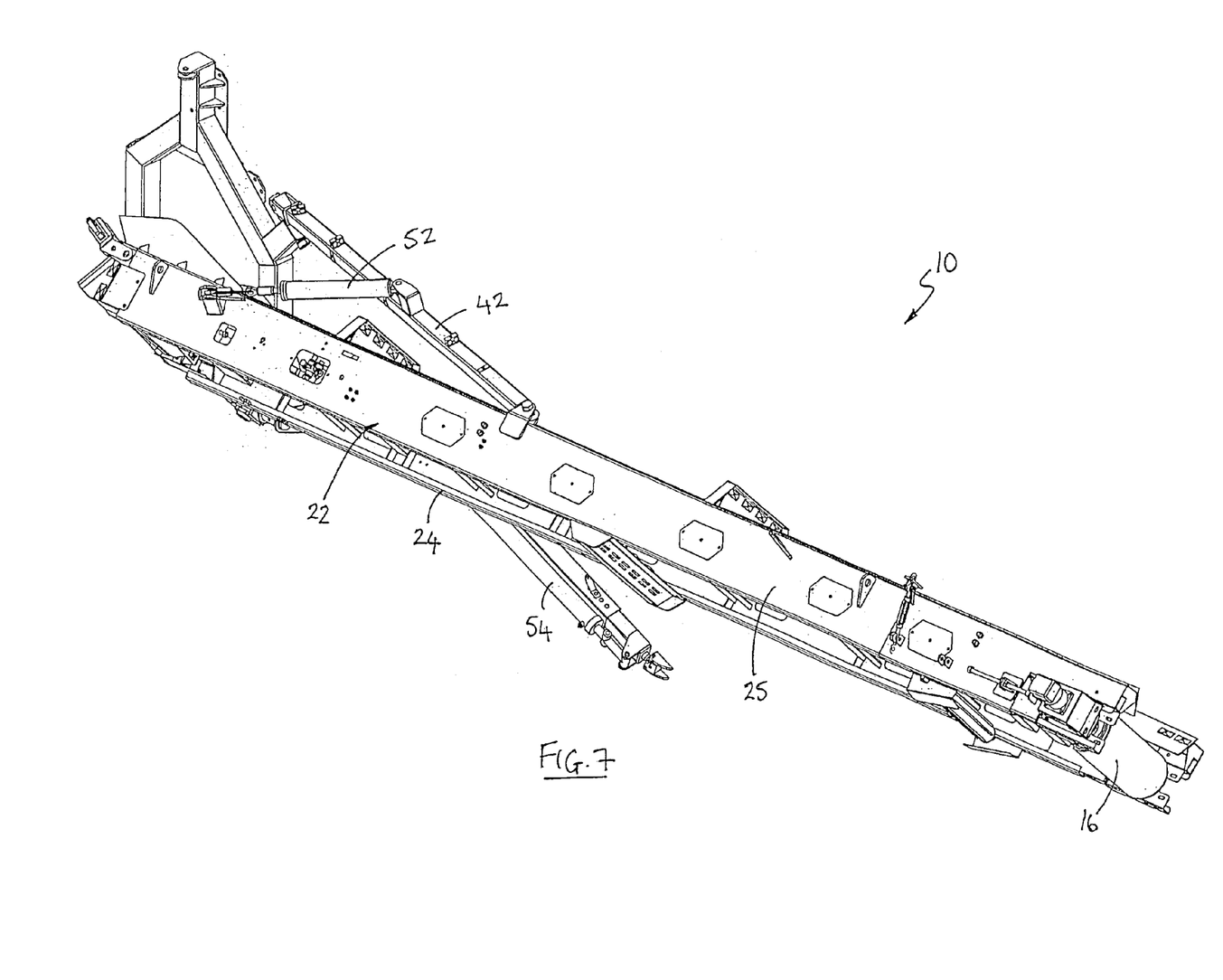

During use, when the rams 52, 54 each adopt a respective extended state, the main frame 22, and therefore the conveyor 10, adopts the deployed state. Upon retraction of the rams 52, 54, either simultaneously or in either sequence, the main frame 22 is drawn towards the apparatus 90 and rotated such that its in use upper, or obverse, face faces the apparatus 90. Hence, the conveyor 10 reaches its folded state in which it is folded substantially against the side of the apparatus 90 (see FIG. 4). The movement of the conveyor 10 between the deployed and folded states may best be appreciated by comparison of FIGS. 6 to 8, FIG. 6 showing the conveyor 10 in the deployed state, FIG. 8 showing the conveyor 10 in the folded state and FIG. 7 showing the conveyor 10 in an intermediate state.

In a preferred mode of use, the conveyor 10 is located at a side of the apparatus 90 adjacent the second side-mounted conveyor 95 (see FIG. 4). The second conveyor 95 may for example be of the type disclosed in U.S. Pat. No. 6,662,939 and may be operable between a deployed state in which it is substantially perpendicular to the longitudinal axis of the apparatus 90 and a folded state in which it is folded against the side of the apparatus 90. In some cases, for example, when both conveyors 10, 95 are required to receive material from a common part of the apparatus 90, e.g. from respective decks of the screen 97, their respective loading ends 11, 98 are required to be adjacent one another. It is preferred, therefore, that the framework 12 is arranged such that the conveyor 10 extends obliquely with respect to the longitudinal axis of the apparatus 90 when in the deployed state. This may be achieved by, for example, suitable configuration of the link bar 42.

It is noted that the preferred conveyor 10 folds or pivots in a relatively compact manner about its base or loading end 11 and the associated framework 12 takes up relatively little space. This makes the conveyor 10 amenable to being located alongside the other conveyor 95 in their respective folded states. In particular, the conveyor 10 may be arranged such that it is located in use below the main part of the conveyor 95 during storage, as may best be seen from FIG. 5.

In an alternative embodiment (FIG. 9), the conveyor is substantially the same as the conveyor 10 of FIGS. 1 to 8, may be coupled to the apparatus 90 in the same way, and similar descriptions apply. However, the arrangement of the first actuating means, or linear actuator 152, is modified in comparison with the embodiment of FIGS. 1 to 8. In particular, the first actuating means, again in the preferred form of a linear actuator 152, for example a hydraulic ram or other ram, is provided between the main frame 22 and the link 42. In this case, however, one end of the ram 152 is coupled to the near side 36 of the mainframe 22, conveniently at a location between the end 44 of the link 42 and the proximal end 30 of the frame 22.

Figure 9:
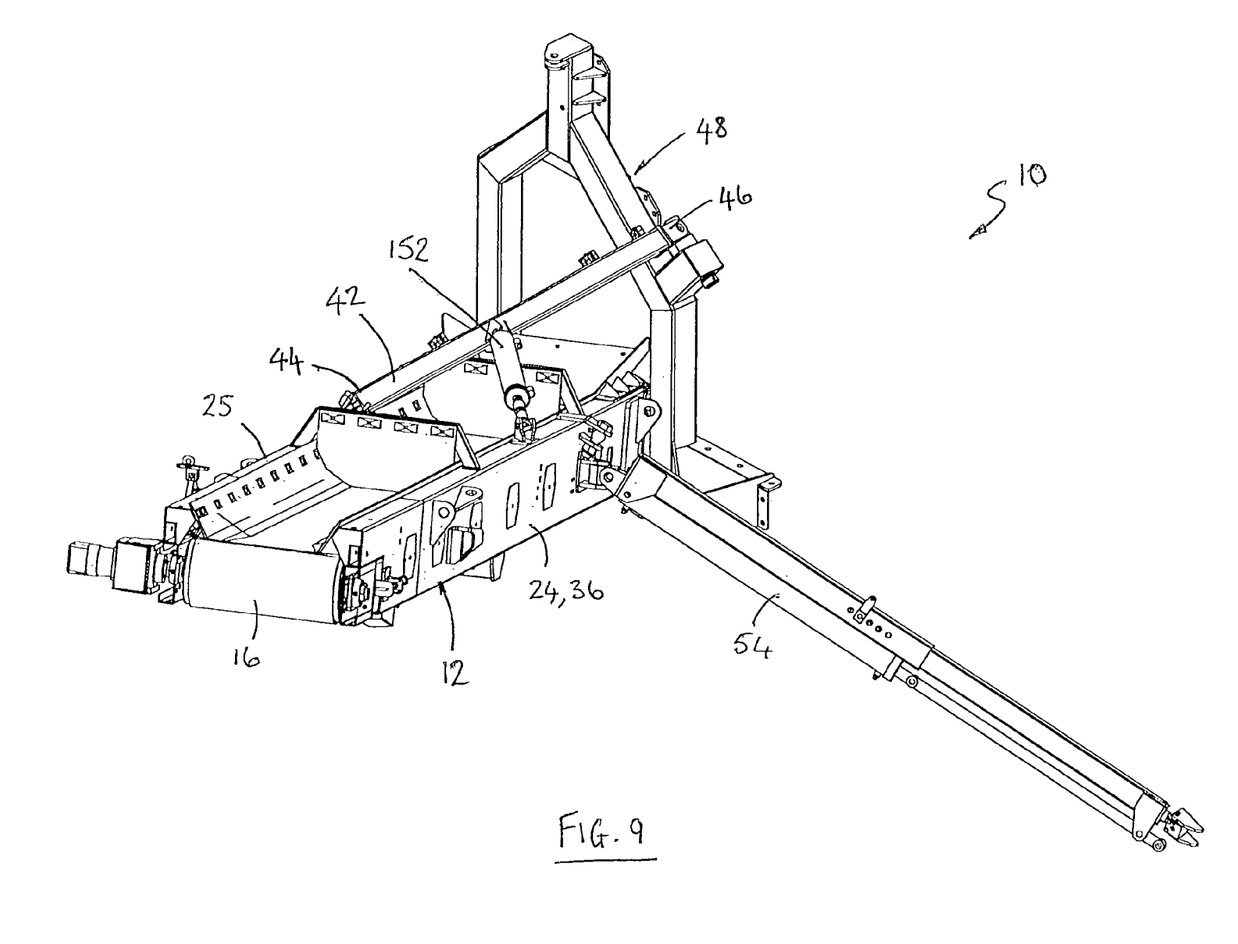
FIG. 9 shows an alternative configuration of the framework in the deployed state.

The other end of the ram 152 is coupled to the link 42 between its ends 44, 46, for example substantially at its mid point. The end of the ram 152 may be coupled to the in use top of the near side 36 as illustrated. The folding and deployment of the conveyor may be substantially the same as hereinbefore described. However, the ram 152 may be said to pull the top of the conveyor up rather than pushing the bottom of the conveyor down. As a result, the conveyor 10 is better supported in its deployed state and the flexing in the conveyor caused by the force of the ram 52 is reduced. In the preferred embodiment, it may be seen that in contrast to the arrangement of the ram 52, the ram 152 is in its contracted state when the conveyor is deployed, and in its extended state when the conveyor is folded.

By pivoting the conveyor 10 about its base, the base being located adjacent the apparatus 90, the conveyor can be folded in a compact manner. The invention is particularly suited for use with conveyors that do not fold at a location along their lengths, or at least not when moving between the deployed and folded states. Hence, the conveyor 10 is pivoted between the deployed and folded states as a unit and without any intermediate folding operations.

The invention is not limited to the embodiment described herein which may be modified or varied without departing from the scope of the invention.

The invention claimed is:

1. A material processing apparatus comprising: a body, a conveyor having an elongate frame with a base, a free end distal the base, and conveying means configured to convey material from said base to said free end; coupling means configured to couple said frame to said body such that said base is located adjacent said body and to allow said frame to rotate about a first axis that extends substantially longitudinally of said frame; and actuating means configured to actuate said conveyor between a deployed state in which it projects from said body, and a folded state in which it is disposed substantially against said body, wherein said coupling means and said actuating means are arranged to cause said frame to pivot about said base away from or towards said body when moving between said deployed and folded states, and to rotate about said first axis said apparatus further comprising a substantially rigid link member having a first end pivotably coupled to the body, and a second end pivotably coupled to a first side of the conveyor and wherein said actuating means comprises at least one actuator coupled between said link member and said conveyor such that, said at least one actuator is operable to cause said frame to rotate about said first axis independently of said movement away from or towards said body.

2. An apparatus as claimed in claim 1, wherein said coupling means comprises at least one pivot device located substantially at said base.

3. An apparatus as claimed in claim 2, wherein said at least one pivot device is configured to allow said conveyor to pivot about at least two mutually perpendicular axes.

4. An apparatus as claimed in claim 2, wherein said at least one pivot device is located at a side of the conveyor, adjacent the base of the conveyor.

5. An apparatus as claimed in claim 1, wherein said link member obliquely traverses said conveyor when in the deployed state.

6. An apparatus as claimed in claim 1, wherein said first end of the link member is coupled to the body at a location above the conveyor when deployed, said link member obliquely traversing the obverse face of said conveyor.

7. An apparatus as claimed in claim 1, wherein a gantry is provided on said body, the base of the conveyor being at least partially received under the gantry when in the deployed state, and wherein said first end of the link member is pivotably coupled to the gantry.

8. An apparatus as claimed in claim 1, wherein said first axis is substantially coincident with, or substantially parallel with, the longitudinal axis of the frame, and wherein said first side of the conveyor is substantially parallel with and spaced apart from said first axis.

9. An apparatus as claimed in claim 8, wherein said first axis is substantially coincident with, or adjacent, a second side of the conveyor, said second side being opposite said first side.

10. An apparatus as claimed in claim 1, wherein said first end of the link member is pivotably coupled to the body at a location that is substantially in register with the base of the conveyor with respect to said first axis that extends substantially longitudinally of the frame, the second end of the link member being coupled to the conveyor at a location between the base and free end, or substantially at the free end.

11. An apparatus as claimed in claim 1, wherein said at least one actuator extends between said link member and said first side of the conveyor.

12. An apparatus as claimed in claim 1, wherein said at least one actuator extends between said link member and a second side of the conveyor, said second side being opposite said first side of the conveyor.

13. An apparatus as claimed in claim 1, wherein said conveyor is obliquely disposed with respect to the body in the deployed state, said first side of the conveyor being located further from said body than the opposite second side of the conveyor.

14. An apparatus as claimed in claim 1, wherein said actuating means includes a second linear actuator extending between said body and the conveyor, said second linear actuator being operable to cause said frame to pivot about said base away from or towards said body when moving between said deployed and folded states.

15. An apparatus as claimed in claim 14, wherein said first axis is substantially coincident with, or adjacent, a second side of the conveyor, said second side being opposite said first side, and wherein said second linear actuator extends between said body and said second side of the conveyor.

16. An apparatus as claimed in claim 1, further including a second conveyor having a base, a free end distal the base, and means for conveying material from said base to said free end, the second conveyor being operable between a deployed state in which it projects from said body, and a folded state in which it is disposed substantially against said body, and wherein the base of the second conveyor is located adjacent the base of said conveyor, said conveyor being located below said second conveyor when both conveyors are in their folded state.

17. An apparatus as claimed in claim 1, wherein said first end of said rigid link member is coupled to said body at a location above said conveyor.

18. An apparatus as claimed in claim 1, wherein said first end of said rigid link member is coupled to said body at a location below said conveyor.

19. An apparatus as claimed in claim 1, wherein said rigid member traverses said conveyor when in the deployed state.

20. An apparatus as claimed in claim 1, wherein said actuating means comprises at least one actuator for pivoting said frame away from or towards said body when moving between said deployed and folded states.

21. A material processing apparatus comprising: a body, a conveyor having an elongate frame with a base, a free end distal the base, and conveying means configured to convey material from said base to said free end; coupling means configured to couple said frame to said body such that said base is located adjacent said body and to allow said frame to rotate about a first axis that extends substantially longitudinally of said frame; and actuating means configured to actuate said conveyor between a deployed state in which it projects from said body, and a folded state in which it is disposed substantially against said body, wherein said coupling means and said actuating means are arranged to cause said frame to pivot about said base away from or towards said body when moving between said deployed and folded states, and to rotate about said first axis, said apparatus further comprising a substantially rigid link member having a first end pivotably coupled to the body, and a second end pivotably coupled to a first side of the conveyor, and wherein said actuating means comprises at least one actuator coupled between said link member and said conveyor such that said at least one actuator is operable to cause said frame to rotate about said first axis, and wherein said actuating means includes at least one other actuator extending between said body and the conveyor, said at least one other actuator being operable to cause said frame to pivot about said base away from or towards said body when moving between said deployed and folded states.

* * * * *